United States Patent
Grassia et al.

(10) Patent No.: US 7,064,761 B2
(45) Date of Patent: Jun. 20, 2006

(54) TECHNIQUES FOR ANIMATING COMPLEX SCENES

(75) Inventors: Frank Sebastian Grassia, Mountain View, CA (US); Marco Jorge da Silva, Oakland, CA (US); Peter Bernard Demoreuille, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 10/843,224

(22) Filed: May 10, 2004

(65) Prior Publication Data

US 2005/0248564 A1 Nov. 10, 2005

(51) Int. Cl.
*G06T 15/70* (2006.01)

(52) U.S. Cl. ...................................... 345/473
(58) Field of Classification Search ................. 345/419
See application file for complete search history.

(56) References Cited

U.S. PATENT DOCUMENTS

| 5,261,041 | A | * | 11/1993 | Susman ...................... 345/473 |
| 5,394,168 | A | | 2/1995 | Smith, III et al. |
| 5,511,158 | A | * | 4/1996 | Sims .......................... 345/440 |
| 5,581,676 | A | | 12/1996 | Ueno |
| 5,689,711 | A | * | 11/1997 | Bardasz et al. ............. 717/105 |
| 5,808,625 | A | | 9/1998 | Picott et al. |
| 6,054,991 | A | | 4/2000 | Crane et al. |
| 6,462,763 | B1 | * | 10/2002 | Mostyn ....................... 715/856 |
| 6,522,331 | B1 | * | 2/2003 | Danks ......................... 345/473 |
| 6,522,335 | B1 | * | 2/2003 | Brown ........................ 345/539 |
| 6,570,578 | B1 | | 5/2003 | Smirnov et al. |
| 6,664,960 | B1 | | 12/2003 | Goel et al. |
| 2002/0075270 | A1 | | 6/2002 | Alden et al. |
| 2002/0175918 | A1 | | 11/2002 | Barber |
| 2003/0227453 | A1 | | 12/2003 | Beier et al. |

OTHER PUBLICATIONS

Using the Hypergraph, Copyright 1999, Alias/Wavefront, downloaded from http://caad.arch.ethz.ch/info/maya/manual/UserGuide/Overview/Hyperg.fm.html on 11-19-2004, 44 pages total.

* cited by examiner

*Primary Examiner*—U Chaule
*Assistant Examiner*—Peter-Anthony Pappas
(74) *Attorney, Agent, or Firm*—Townsend and Townsend and Crew LLP

(57) ABSTRACT

Techniques that enable users (e.g., animators) to accurately animate models in a scene without having to load all the models involved in the scene concurrently in computer memory. For a particular model that a user wishes to animate, only a minimal set of models involved in the scene that are needed for the particular model to evaluate correctly are determined and loaded into computer memory. Additionally, if a particular model is to be unloaded from computer memory, then all models that depend, either directly or indirectly, on the particular model and that are loaded in memory are also unloaded from memory in order to avoid incorrect animation.

26 Claims, 10 Drawing Sheets

TECHNIQUES FOR ANIMATING COMPLEX SCENES

CROSS-REFERENCES TO RELATED APPLICATIONS

The present application incorporates by reference for all purposes the entire contents of the following applications:

(1) U.S. patent application Ser. No. 10/843,690 entitled STORING INTRA-MODEL DEPENDENCY INFORMATION, filed concurrently with the present application;

(2) U.S. patent application Ser. No. 10/843,688 entitled TECHNIQUES FOR PROCESSING COMPLEX SCENES, filed concurrently with the present application; and (3) U.S. patent application Ser. No. 10/842,962 entitled TECHNIQUES FOR RENDERING COMPLEX SCENES, filed concurrently with the present application.

BACKGROUND OF THE INVENTION

The present application relates to computer-generated imagery (CGI) and animation, and more particularly to techniques for processing and manipulating complex scenes.

The complexity of scenes in animated films keeps increasing with each new film as the number of objects in a scene and the level of interaction between the objects in a scene keeps increasing. Each object in a scene is generally represented by a model. A model is generally a collection of geometric primitives, mathematical representations, and other information that is used to describe the shape and behavior of an object. Accordingly, a scene may comprise multiple objects (each represented by a model) interacting with each other.

Scenes are generally created by animators that specify the movement of the models and the interactions between the models. Conventionally, in order for an animator to specify the animation for a particular scene, information related to all the models involved in the scene must be loaded into memory of the animator's computer or workstation. However, due to the larger number of models involved in scene of new films and the richer interactions between the models, quite often the computing and memory resources of the animator's computer are inadequate to load and process all the models involved in a scene. The increasing complexity of scenes has also impacted the manner in which scenes are rendered. Conventionally, when a 3D scene is rendered into a 2D image, all the models involved in the scene must be concurrently loaded into memory of computer(s) allocated for the rendering process in order for the scene to be rendered. However, many times for a complex scene, the memory resources of a renderer are not large enough to accommodate the information that must be loaded to render the scene. Nevertheless, animators and renderers must be able to animate and render such complex scenes with a minimum of overhead devoted to working around the above-mentioned limitations.

One conventional technique that is used to try to resolve the above-mentioned problems is to reduce the complexity of a scene. This is done by representing each object in a scene at a low-fidelity that consumes less memory when loaded into computer memory of a computer. The low fidelity representations also evaluate more rapidly than the final (render) quality versions. However, even with the low-fidelity versions of the models, there is a limit to the number of models that can be loaded into computer memory simultaneously. Further, as more and more models are loaded, the interactions between the models considerably slow down thereby making the animation task slow and arduous. Also, extra work on part of the animators is needed to build low-fidelity versions of models and swap them in and out of scenes. This technique also does not help during the rendering process since final rendering generally requires the highest-fidelity (or full-fidelity) versions of the models to be used.

Another conventional technique that is commonly used to process large scenes is scene segmentation. In this technique, a user (e.g., an animator) arbitrarily breaks up a scene into multiple sets of models, each of which becomes a scene of its own that is animated and rendered separately. The resultant sub-scene images are then composited together. This decomposition is however artificial and an impediment to the creative process. Further, it may be very difficult or even impossible to break up a scene in which many models are interacting with one another.

In light of the above, techniques are desired that enable users such as animators and other artists to process and manipulate large and complex scenes in an easy manner.

BRIEF SUMMARY OF THE INVENTION

Embodiments of the present invention provide techniques that enable users (e.g., animators) to accurately animate models in a scene without having to load all the models involved in the scene concurrently in computer memory. For a particular model that a user wishes to animate, only a minimal set of models involved in the scene that are needed for the particular model to evaluate correctly are determined and loaded into computer memory. Additionally, if a particular model is to be unloaded from computer memory, then all models that depend, either directly or indirectly, on the particular model and that are loaded in memory are also unloaded from memory in order to avoid incorrect animation. In one embodiment, a representation of the inputs and outputs of the various models involved in the scene and the dependencies between the inputs and the outputs is provided and used to determine the set of models to be loaded or unloaded.

According to an embodiment of the present invention, techniques are provided for facilitating animation of a scene comprising a plurality of models. In one embodiment, information is received identifying a first model from the plurality of models. A first representation is used to determine a set of models from the plurality of models that are needed for evaluation of the first model, the first representation comprising information identifying one or more inputs and outputs of the models in the plurality of models and identifying dependencies between the one or more inputs and outputs. The first model and the set of models are loaded in computer memory, wherein the plurality of models comprises at least one model that is not loaded into the computer memory.

According to another embodiment of the present invention, techniques are provided for facilitating animation of a scene comprising a plurality of models. In one embodiment, information is received identifying a first model from the plurality of models to be unloaded from computer memory. A first representation is used to determine a first set of models from the plurality of models that depend on the first model, the first representation comprising information identifying one or more inputs and outputs of the models in the plurality of models and identifying dependencies between the one or more inputs and outputs. The first model and one or more models from the first set of models that are loaded in the computer memory are then unloaded from the computer memory.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
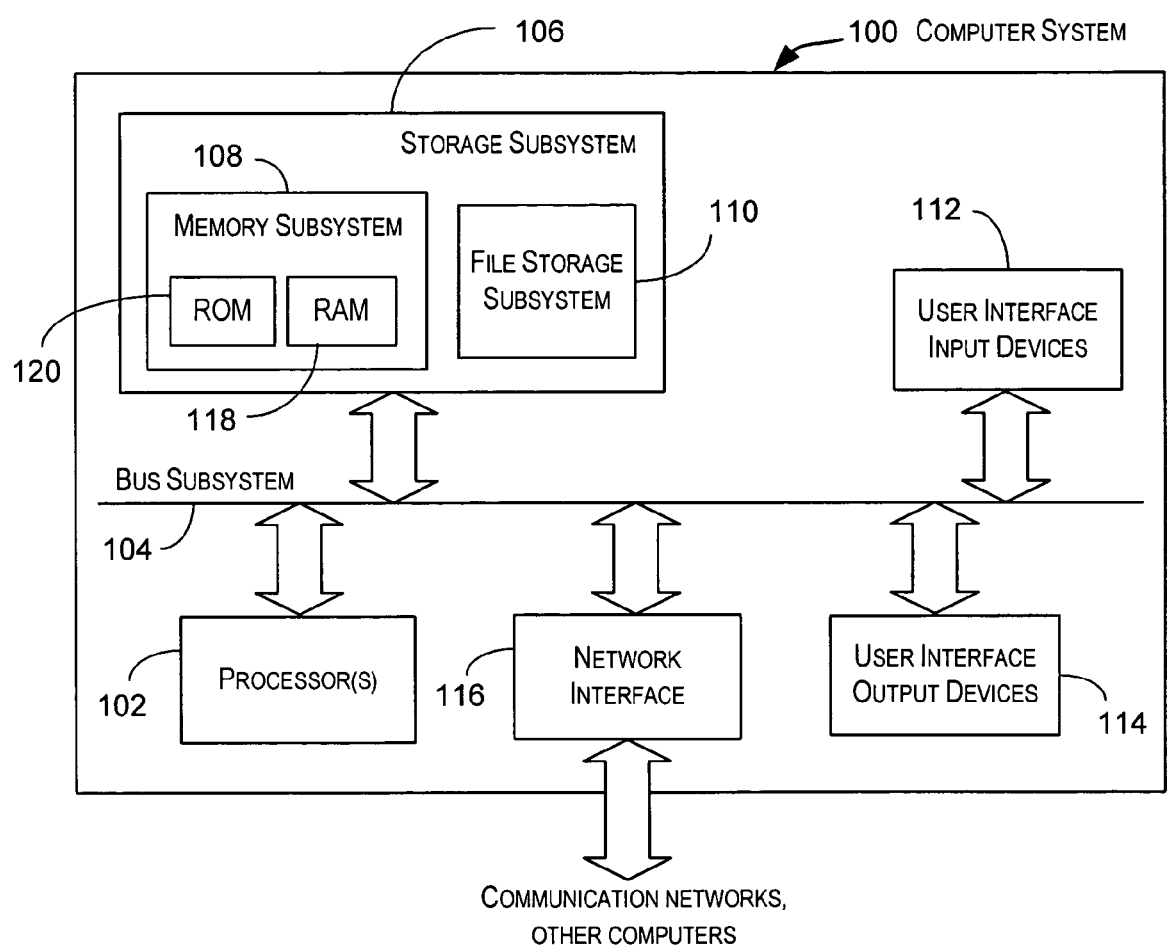
FIG. 1 is a simplified block diagram of a computer system 100 that may be used to practice an embodiment of the present invention.

Embodiments of the present invention provide techniques for processing large and complex scenes. Artists such as animators, renderers, and layout artists can work with complex scenes in a natural way without having to worry about the complexities of the scene, available memory and/or computing resources, scene segmentation, different fidelity representations, and dependencies between models in a scene. FIG. 1 is a simplified block diagram of a computer system 100 that may be used to practice an embodiment of the present invention. For example, systems such as computer system 100 may be used by an animator to specify or assemble a scene. Systems such as computer system 100 may also be used to render scenes.

As shown in FIG. 1, computer system 100 includes a processor 102 that communicates with a number of peripheral devices via a bus subsystem 104. These peripheral devices may include a storage subsystem 106, comprising a memory subsystem 108 and a file storage subsystem 110, user interface input devices 112, user interface output devices 114, and a network interface subsystem 116. The input and output devices allow a user, such as the administrator, to interact with computer system 100.

Network interface subsystem 116 provides an interface to other computer systems, and networks. Network interface subsystem 116 serves as an interface for receiving data from other sources and for transmitting data to other sources from computer system 100. Embodiments of network interface subsystem 116 include an Ethernet card, a modem (telephone, satellite, cable, ISDN, etc.), (asynchronous) digital subscriber line (DSL) units, and the like.

User interface input devices 112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 100.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100.

Storage subsystem 106 may be configured to store the basic programming and data constructs that provide the functionality of the present invention. For example, according to an embodiment of the present invention, software code modules (or instructions) implementing the functionality of the present invention may be stored in storage subsystem 106. These software modules may be executed by processor(s) 102. Storage subsystem 106 may also provide a repository for storing data used in accordance with the present invention. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. RAM is generally semiconductor-based memory that can be read and written by processor 102. The storage locations can be accessed in any order. The term RAM is generally understood to refer to volatile memory that can be written to as well as read. There are various different types of RAM. For purposes of this application, references to information being loaded or unloaded from compute memory refer to loading or unloading the information from RAM (or any other volatile computer memory used by a program or process during execution) of a computer.

File storage subsystem 110 provides persistent (non-volatile) storage and caching for program and data files, and may include a hard disk drive, a floppy disk drive along with associated removable media, a Compact Disk Read Only Memory (CD-ROM) drive, an optical drive, removable media cartridges, and other like storage media.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Computer system 100 can be of various types including a personal computer, a portable computer, a workstation, a network computer, a mainframe, a kiosk, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

A scene refers to a set of frames shot (generally continuously) using a camera between a start time and an end time. Scenes are generally specified (or assembled) by one or more animators. Information stored for a scene may include camera angles information, lighting information, the starting time and ending time for the scene, information identifying the models in a scene, descriptions of the models, description of how the models interact or move within a scene, and other information. In one embodiment, the information may be stored in a scene data file, as a scene graph, etc. The stored scene information is then used to render the scene so that is can be viewed by animators, and others. The process of specifying a scene is typically an iterative process where an animator assembles a scene, views the rendered scene, makes changes to the scene if necessary, and repeats the process.

A scene may include a number of objects or components possibly interacting with one another. Each object may be represented by a model. A model is generally a collection of geometric primitives, mathematical representations, and other information that is used to describe the shape and behavior of an object. Information specifying a model may be referred to as model information.

Each model may comprise (or is characterized by) a set of input parameters (or inputs) and a set of outputs. Values may be provided to the inputs to position and configure the geometric primitives of the model. Values of the outputs may represent the orientation and position of the geometric primitives of the model. An input of a model may receive its value from (and thus depend upon) one or more outputs of other models or of the same model. An output of a model may receive its value from (and thus depend on) one or more inputs of the model, i.e., values of the inputs are used to compute the output's value. Dependencies may also be classified as intra-model or inter-model. When an output of a model depends on one or more inputs of the same model, or when an input of a model depends on one or more outputs of the same model, such a dependency is referred to as an intra-model dependency (or intra-model dataflow connection). When an input of one model depends on an output of another model, the dependency is referred to as an inter-model dependency (or inter-model dataflow connection). Intra and inter-model dependencies may arise from constraints placed by the animator on a model and between models.

Generally, a model A depends on another model B if model A makes use of data provided by model B. For example, model A depends directly on model B if an input or output of model A uses a value of an input or output of model B. Model B may in turn depend on other models, which may in turn depend on other models, and so on. Model A indirectly depends on models that model B depends on, models that those models depend on, and so on. For example, if model A depends on model B which depends on model C which in turn depends on model D, then model A depends directly on model B and indirectly on models C and D. The set of models that model A depends on includes all models on which model A directly or indirectly depends on. For the above example, the set of models on which model A depends includes models B, C, and D. The set may also be referred to as the transitive closure set of models that model A depends on.

In the above example, where model A depends on model B which depends on model C which in turn depends on model D, models A, B, and C represent the models that depend upon model D. Accordingly, a set comprising models A, B, and C represents a transitive closure set of models that depend on model D.

Two models may exhibit a dependency where model A depends on model B and model B depends on model A, although there can be no input/output pair anywhere in a scene at any particular time in which the input depends on the output and the output also depends on the input, as that would cause the output's value to be incomputable Dependencies may either be static or dynamic in nature. A static dependency is a dependency that is fixed or time invariant over a period of time. A dynamic dependency is a dependency that may be time variant over a period of time. An intra-model dependency where an output of a model depends on one or more inputs of the same model is generally a static dependency that is configured when the model is built.

Figure 2:
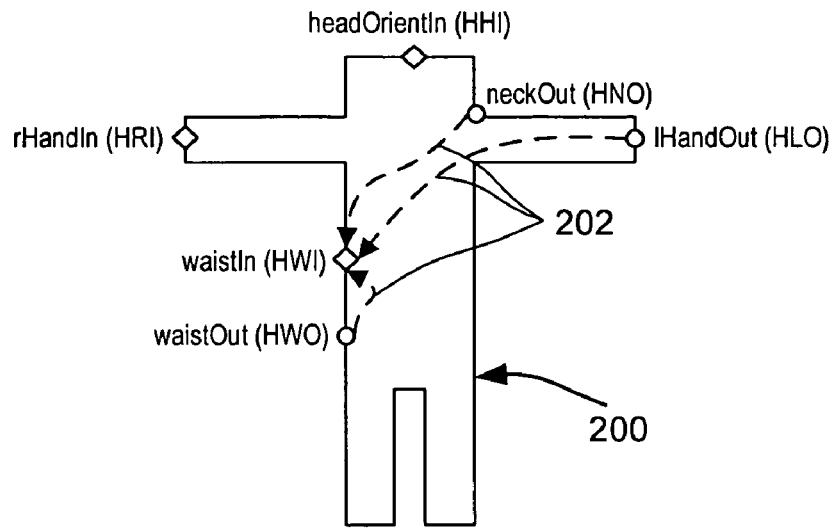
FIG. 2 depicts a schematic representation of a Human model according to an embodiment of the present invention.

Consider a scene in which a human with a cell-phone clipped to his belt follows the progress of the moon with his gaze, while leaning with his right hand on a rail and holding a cup of coffee in his left hand. The scene may include several models including models representing the human, phone, rail, cup, moon, etc. Each model may have a set of inputs and outputs. FIG. 2 depicts a schematic representation of a Human model 200 according to an embodiment of the present invention. Human model 200 comprises three inputs (shown by diamonds and having an "In" label ending) and three outputs (shown by circles and having an "Out" label ending). The inputs include waistin (HWI), headOrientIn (HHI), and rHandIn (HRI). The outputs include waistOut (HWO), neckOut (HNO), and lHandOut (HLO).

Figure 6:
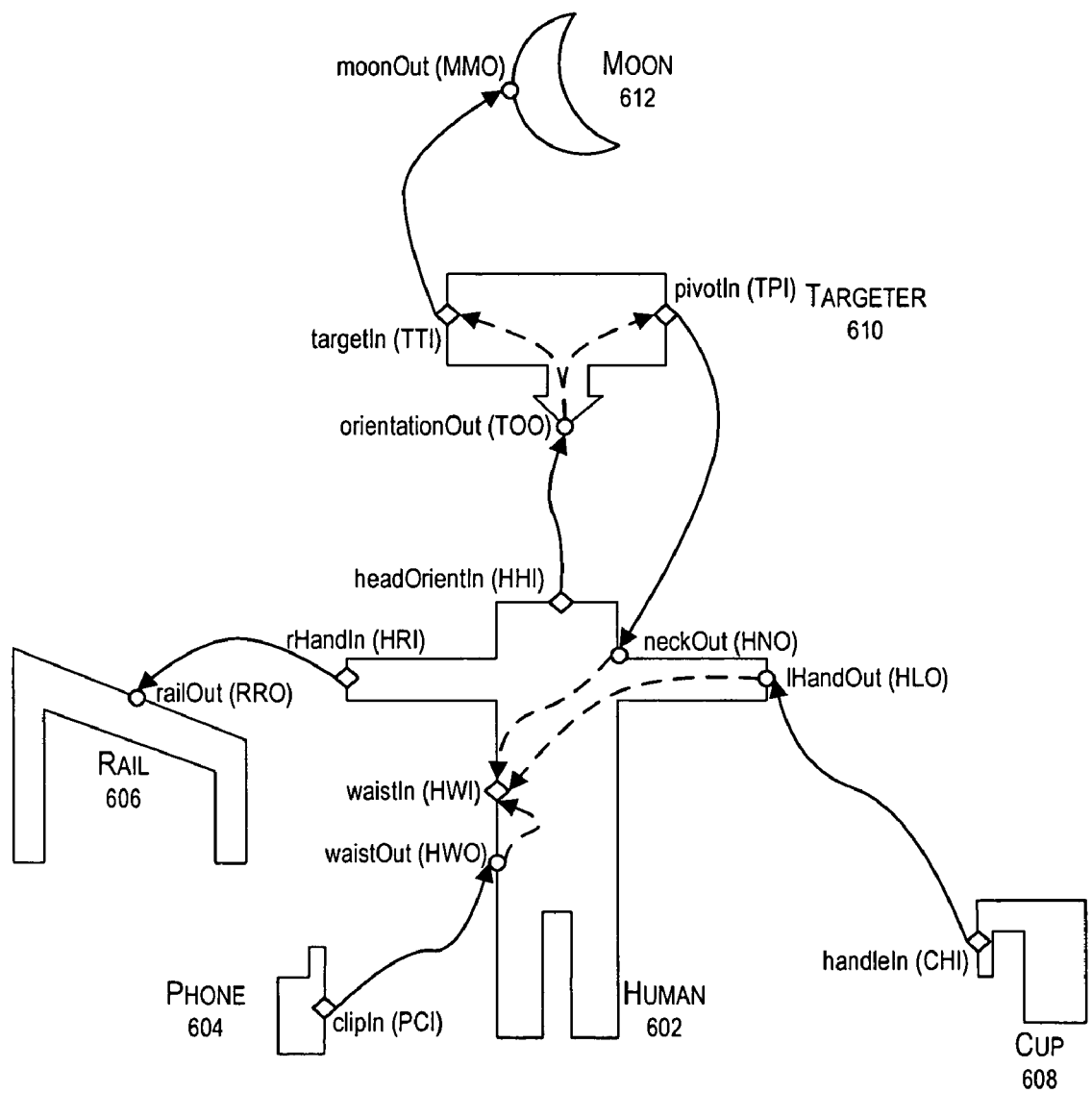
FIG. 6 depicts a schematic view of a proxy connection graph according to an embodiment of the present invention.

In FIG. 2, dotted arrows 202 are used to represent the static intra-model dependencies where an output of the model depends on one or more inputs of the same model. The arrows point in the direction of the dependency. For example, as shown, neckOut (HNO) depends on waistin (HWI), lHandOut (HLO) depends on waistIn (HWI) and waistOut (HWO) depends on waistin (HWI). The inter-model dependencies for the scene are depicted in FIG. 6 and described below.

According to an embodiment of the present invention, in order to facilitate processing of large scenes, the model information for each model included in a scene is analyzed to determine the static intra-model dependencies (or static intra-model dataflow connections) between inputs and outputs of the model. The static intra-model dependency information (or static intra-model dataflow connection information) for a model is persistently cached. Various different techniques may be used for caching the static intra-model dependency information. According to an embodiment of the present invention, the static intra-model dependency information for a model is stored in a file (referred to as the "hook file" or "hook") associated with the model. A hook file for a model may also store other information for the model besides dependency information. The information may be stored in various formats. In one embodiment, the information is stored in the form of a directed graph such that the nodes of the graph represent (are proxies for) the inputs or outputs of a model and the links between the nodes represent the static intra-model dataflow connections. Other data structures may also be used in alternative embodiments.

An example of static intra-model dependency information that may be stored in a hook file is shown below. The hook file comprising the information below is associated with a Human model (different from the model depicted in FIG. 2).

```
hook "Human" {
    inputHandles = waistIn, headOrientIn, rHandIn, lHandIn;
    outputHandles = waistOut waistIn, neckOut waistIn, rHandOut
    rHandIn waistIn, lHandOut lHandIn waistIn;
}
```

As shown above, the "inputHandles" identifies the inputs of the Human model, namely, waistIn, headOrientIn, rHandIn, and lHandIn. The "outputHandles" identifies the outputs of the model and also their static intra-model dependencies. As shown above, there are four outputs, namely, waistOut, neckOut, rHandOut, and lHandout. The output waistOut depends on input waistin, the output neckOut depends on input waistIn, the output rHandOut depends on inputs rHandIn and waistIn, and the output lHandOut depends on inputs lHandin and waistIn.

Figure 3:
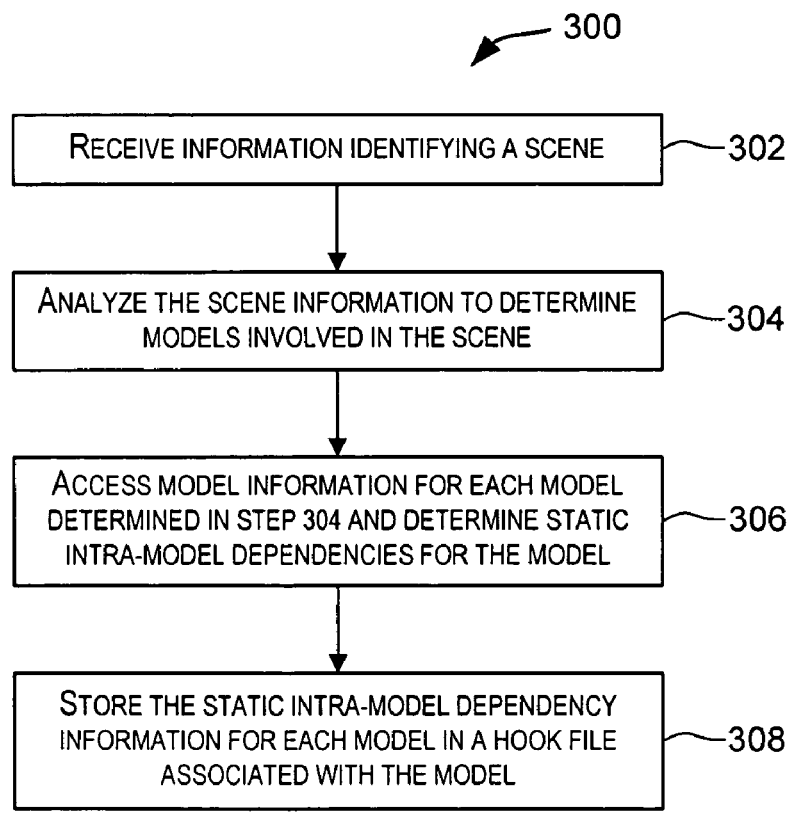
FIG. 3 is a simplified high-level flowchart depicting a method of processing models in a scene to determine static intra-model dependencies for the models according to an embodiment of the present invention.

FIG. 3 is a simplified high-level flowchart 300 depicting a method of processing models in a scene to determine static intra-model dependencies for the models according to an embodiment of the present invention. The method depicted in FIG. 3 may be performed by software modules executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, processing is initiated upon receiving information identifying a scene (step 302). The scene information is then analyzed to determine the one or more models involved in the scene (step 304). As is known in the art, the scene information may be stored in various forms such as a scene graph, etc. and may be used to perform the analysis in step 302. Model information for each model identified in step 304 is then accessed and the static intra-model dependencies of the outputs of a model on the inputs of the model are determined for each model (step 306). According to an embodiment of the present invention, as part of step 306, each model is loaded into computer memory (i.e., the model information for the model is loaded into computer memory), the dependencies determined using the loaded model information, and then the model may be unloaded from the computer memory. Accordingly, all the models (i.e., the model information for all the models) do not need to be loaded into computer memory concurrently to determine static intra-model dependency information. For each model, the static intra-model dependency information determined for the model in step 306 is then persistently stored, for example in a hook file that is associated with the model (step 308).

In alternative embodiments, instead of doing the analysis on a scene basis as depicted in FIG. 3, the intra-model static dependencies for a model may be determined and stored in a hook file associated with the model when the model is built or configured. Accordingly, whenever the model is subsequently used, the static intra-model dependency information for the model is available for processing from the hook file associated with the model. If a model is modified (i.e., model information for the model is changed), the dependency information stored in the hook file associated with the model may be updated to reflect the dependency changes, if any, resulting from the changed model information.

In other embodiments, a user may select or specify the models for which intra-model dependency information is to be computed. In these embodiments, for each model specified by the user, the model information for the model is analyzed to determine the static intra-model dependencies for the model, and the dependency information is cached in a hook file associated with the model.

Figure 4:
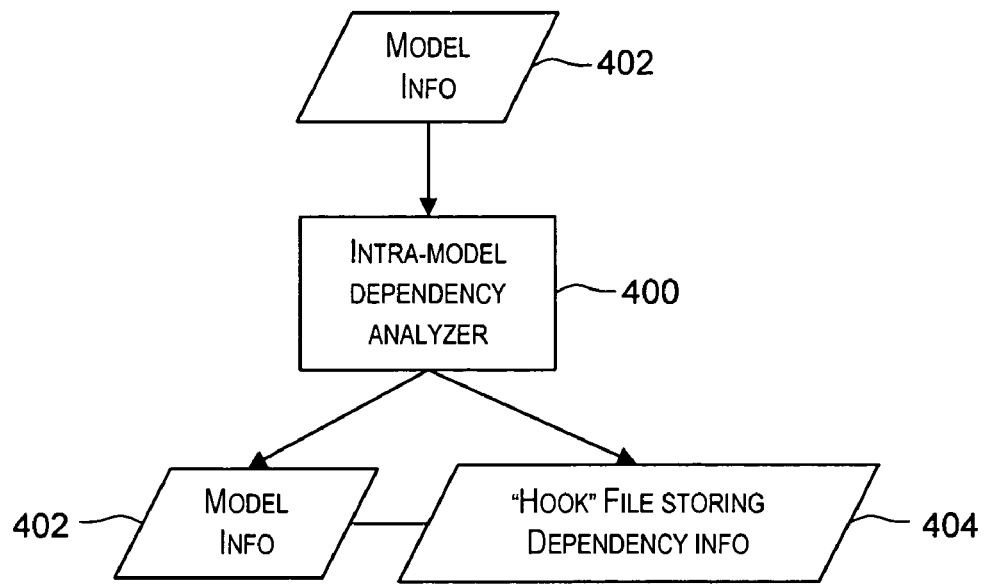
FIG. 4 depicts a module that may be used to determine and store static intra-model dependency information according to an embodiment of the present invention.

FIG. 4 depicts a module that may be used to determine and store static intra-model dependency information according to an embodiment of the present invention. As depicted in FIG. 4, an intra-model dependency analyzer 400 may be provided. Intra-model dependency analyzer 400 takes as input model information 402 for a model, analyzes model information 402 to determine the static intra-model dependency information, and stores the dependency information in a hook file 404 associated with the model or with the model information. Intra-model dependency analyzer 400 may be implemented using software, hardware, or combinations thereof.

As an artist works on a scene, the authored data that represents the animations for the model in the scene is stored in a cue. The cue stores information describing the inter- and intra-model dataflow connections among the models for the scene. The cue stores time varying specification for inputs of models that is used to pose the models. Cues may store time-varying (i.e., dynamic) dependencies between the models, including the intra- and inter-model dependencies between the inputs and outputs of models. According to an embodiment of the present invention, based upon the cue information for a scene and the given the hooks for the models in the scene, a representation is constructed in memory for the scene. The memory representation that is constructed stores information specifying the inter- and intra-model dependencies (i.e., the inter- and intra-model dataflow connections) between the various inputs and outputs of the models included in a scene. The memory representation encapsulates the relationships between the models in a scene.

In one embodiment, the memory representation is a directed graph, referred to as a proxy connectivity graph. Other data structures may also be used for the memory representation in alternative embodiments. The nodes of the proxy connectivity graph represent (are proxies for) inputs and outputs of the models of the scene and the directed links between the nodes represent the dataflow connections or dependencies (both static and dynamic inter-model and intra-model dependencies) between the inputs and outputs of the models. When referring to a proxy connectivity graph, the words proxy and node will be used interchangeably. The proxy connectivity graph is built based upon the hooks and cues that are (in comparison to models) inexpensive to load and keep resident in memory for purposes of constructing the proxy connectivity graph. The proxy connectivity graph itself is lightweight compared to loading all the models and thus can be easily loaded and kept resident in computer memory for further processing.

The proxy connectivity graph also stores information about the mapping of dataflow connections to corresponding authored elements in the cue. A user (e.g., an animator) may use the proxy graph to create and delete connections between models without requiring all the models to be loaded, using the same user interface components, with deep analysis capabilities available. For instance, the user can verify that a requested dataflow connection is legal (e.g., creates no cycles in the connectivity graph) from the proxy graph. The user can perform operations such as establishing and breaking time-varying relationships between models by making changes to the proxy connectivity graph without needing to load all models simultaneously. The user can automatically propagate changes to the proxy connectivity graph back into the actual scene graph or scene information itself.

Figure 5:
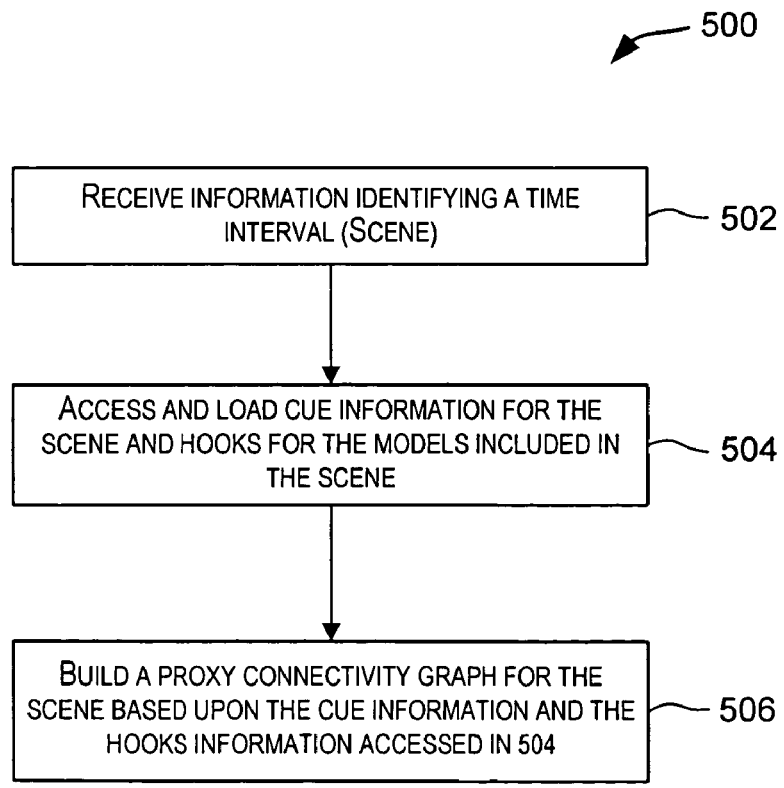
FIG. 5 is a simplified high-level flowchart depicting a method of constructing a proxy connectivity graph according to an embodiment of the present invention.

FIG. 5 is a simplified high-level flowchart 500 depicting a method of constructing a proxy connectivity graph according to an embodiment of the present invention. The method depicted in FIG. 5 may be performed by software modules executed by a processor, hardware modules, or combinations thereof. Flowchart 500 depicted in FIG. 5 is merely illustrative of an embodiment of the present invention and is not intended to limit the scope of the present invention. Other variations, modifications, and alternatives are also within the scope of the present invention. The method depicted in FIG. 5 may be adapted to work with different implementation constraints.

As depicted in FIG. 5, processing is initiated upon receiving information identifying a time interval (step 502). The time interval may be characterized by a start time (Ts) and an end time (Te). According to an embodiment of the present invention, the start time (Ts) corresponds to the start time of a scene and the end time (Te) corresponds to the end time of the scene. In alternative embodiments, the time interval may also correspond to a subset of the scene.

The hooks information (i.e., information stored in the hook files associated with the model) for the models included in the scene and the cues information for the scene is then accessed and loaded into memory (step 504). As previously described, the hook information for a model stores the static intra-model dependencies for the model. The cues information comprises information describing the time-varying inter and intra-model dataflow connections among the models for the scene. The cue information stores time varying specification for inputs of models that is used to pose the models; these specifications determine the time-varying (i.e., dynamic) dependencies between inputs and outputs of models. Any arbitrary type of dataflow connection or dependency may be defined including two-way dataflow connections between models, transfer of data from a model to itself, transfer of data from a model to another model, and the like. Both the hooks and the cues are lightweight and inexpensive to load and keep resident in memory of a computer, as compared to loading the models themselves (i.e., loading the model information for all the models).

A proxy connectivity graph is constructed based upon the hooks information accessed and the cues information accessed and loaded in step 504 (step 506). The nodes of the proxy connectivity graph represent the inputs and outputs of the models included in the scene and the links between the nodes represent dataflow connections or dependencies between the inputs and the outputs for the time interval. The proxy connectivity graph is built and kept resident in computer memory for further use.

An example of a proxy connectivity graph is depicted in FIG. 6. FIG. 6 depicts a schematic view of a proxy connection graph according to an embodiment of the present invention for a scene in which a human with a cell-phone clipped to his belt follows the progress of the moon with his gaze, while leaning with his right hand on a rail and holding a cup of coffee in his left hand. The scene includes several models including a Human 602, a Phone 604, a Rail 606, a Cup 608, a Targeter 610, and a Moon 612. Each model has one or more inputs and/or outputs. For purposes of clarity, inputs have labels ending in "In" and are depicted using diamonds while outputs have labels ending in "Out" and are depicted using circles. The input and output nodes are also labeled using three letter labels (e.g., HWO, PCI). The first letter of the label identifies the model to which the input/output belongs, for example, "H" for Human, "P" for Phone, "M" for Moon, "C" for Cup, "T" for Targeter, and "R" for Rail.

As shown in FIG. 6, the scene results in a number of intra and inter-model dependencies. The arrows between the inputs and outputs depict the dependencies for the scene (which is opposite to the direction of dataflow). The arrows point in the direction of the dependency. Accordingly, in FIG. 6, a first node depends on a second node if an arrow originates (i.e., tail of the arrow) from the first node and points to the second node (i.e., head of the arrow points to the second node). In FIG. 6, static intra-model dependencies are depicted using dotted arrow lines while inter-model dependencies are depicted using solid arrow lines. For example, the coffee cup is constrained to the human's left hand because anywhere the human moves the hand, the cup must follow, and therefore the cup effectively takes its position from the hand. Accordingly, as depicted in FIG. 6, the handleIn input of the Cup depends upon the lHandOut output of the Human model. The nodes representing the inputs and outputs along with the arrows represent the proxy connectivity graph for the scene.

Targeter model 610 does not represent a physical object that will appear in the rendered scene, but rather a separate unit of computation not built into any model and therefore usable by any model. Targeter model 610 encapsulates the computation that will orient an object to point at a second target object, given the first object's own pivot (center of rotation). This is a common computation in computer graphics, and is frequently embedded directly in models that require the computation. It is a simple example of a pattern that may be commonly used for other, much more complicated computations.

A proxy connectivity graph for a scene may be used for several different applications. For example, the proxy graph may be used to enable a user (e.g., an animator) to specify animation for a large complex scene such that only those models that are needed for the animation are loaded in computer memory—all the models involved in the scene do not have to be loaded. According to an embodiment of the present invention, the proxy connectivity graph for a scene is used to determine the models that are required, either directly or indirectly, for the animation. For example, for any given model in a scene, the proxy connectivity graph for the scene can be walked or traversed to determine which other models would need to be loaded in order for the given model to be able to evaluate itself correctly. The proxy graph is traversed to determine a transitive closure set (or recursive closure set) comprising one or more models from the scene, including the given model, that are needed for the given model to evaluate correctly. This allows users to easily load all and only the models necessary for them to work, even in a very large scene with many models without having to load all the models concurrently in computer memory.

For example, if an animator wishes to animate a particular model (or set of models) for a large scene, only a minimal subset of the scene's models that are needed to properly animate the particular model specified by the animator need to be loaded into the memory of the system used by the animator. The animator need only identify the models from a scene in which the animator is interested, and an embodiment of the present invention automatically constructs the proxy connectivity graph (if it is not already constructed and resident in memory) for the scene based on the cues for the scene and based upon hooks of the models included in the scene, traverses the proxy graph to determine a minimal set (transitive or recursive closure set) of models that are needed to be concurrently loaded in memory in order for the user-identified models to evaluate correctly, and loads the determined minimal set of models and the user-identified models into the memory of the computer used by the user. All the models do not have to be loaded. Accordingly, the proxy connectivity graph for a scene provides the ability to automatically and dynamically manage the number of models that need to be loaded into a computer memory for processing of the scene.

Figure 7A:
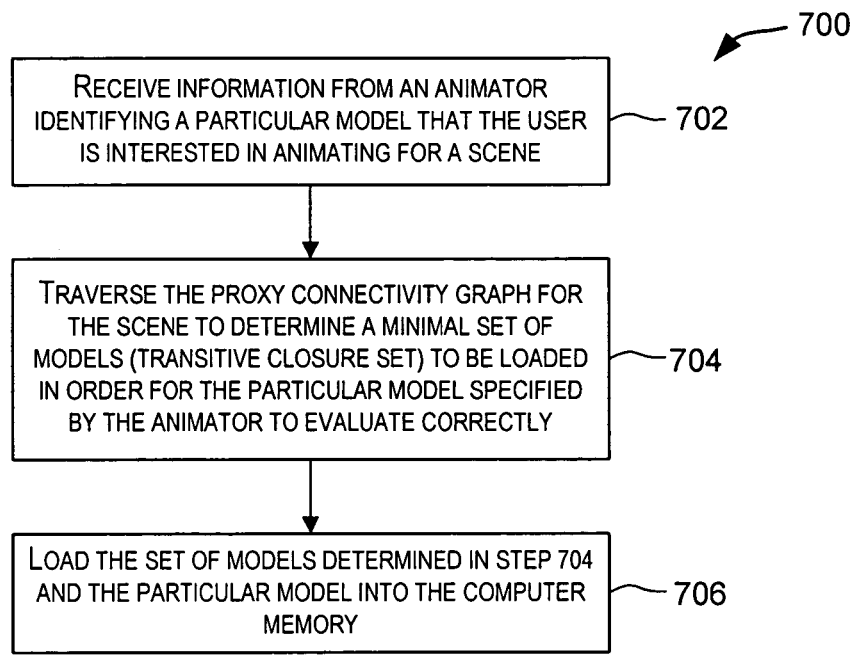
FIG. 7A is a simplified high-level flowchart depicting a method of loading models for animation according to an embodiment of the present invention.

FIG. 7A is a simplified high-level flowchart 700 depicting a method of loading models for animation according to an embodiment of the present invention. The method depicted in FIG. 7A may be performed by software modules executed by a processor, hardware modules, or combinations thereof. Flowchart 700 depicted in FIG. 7A is merely illustrative of an embodiment of the present invention and is not intended to limit the scope of the present invention. Other variations, modifications, and alternatives are also within the scope of the present invention. The method depicted in FIG. 7A may be adapted to work with different implementation constraints.

As depicted in FIG. 7A, information may be received from an animator identifying a particular model (or multiple models) that the animator is interested in animating for a scene (step 702). Based upon the information received in step 702, the proxy connectivity graph for the scene that is resident in computer memory is traversed to determine a minimal set of models including models that are needed to be loaded in order for the particular model specified by the animator to evaluate correctly (step 704). The minimal set of models represents the transitive closure (or recursive closure) set of models with respect to dependencies of the particular model specified by the animator that are needed for the user-specified model to evaluate correctly. For example, the minimal set of models may include a first set of models on which the particular animator-specified model depends, a second set of models on which the first set of models depends on, and so on recursively.

According to an embodiment of the present invention, as part of step 704, each input of the model to be loaded is considered in turn. For each input being considered, a node in the proxy graph representing the input is determined. Using the input node as the starting point and using the directed links of the proxy graph, the proxy graph is traversed or walked in the direction of the dependencies to identify nodes on which the input node being examined depends upon, either directly or indirectly (e.g., if a directed arrow in the proxy graph from a first node to a second node indicates that the first node depends on or uses a value of the second node, then the graph is walked in the direction of the directed arrows). As a result of the traversal, a transitive closure set of all inputs and outputs on which the input of the particular model being considered depends upon is determined. A record is kept of which models' nodes are encountered during the walk. The union of the models recorded for each "walk" for each input of the particular node represents the minimal set of models to be loaded in computer memory simultaneously for the particular model to evaluate correctly. Any model whose input or output is encountered during the traversals is included in the minimal set of models.

The set of models determined in step 704 and the particular model specified by the user are then loaded in the computer memory of the animator's computer to enable accurate animation of the particular model specified by the animator in step 702 (step 706). The animator may then animate the particular model. In this manner, an animator can perform animation for a large scene comprising several models without having to load all the models for the scene concurrently into the computer memory. Embodiments of the present invention thus enable a user to animate models from a large complex scene even if the animator's computer's memory is not large enough to load all the models for the scene. By loading only the models that are required to properly animate a particular model, the proper animation of the particular model is assured without having to load all the models in the scene.

For example, let's assume that the animator wishes to animate the Human model in the graph depicted in FIG. 6 using animation software. The animator selects the Human for loading, and a system configured according to the teachings of the present invention determines what other models must also be loaded in order for the Human to move correctly while the animator animates it. The proxy connectivity graph is traversed to determine the dependencies. In one embodiment, each node representing an input of the Human model is examined in turn, and the proxy graph is walked from each node, recording which other models' nodes are encountered. For the Human model, the models that will be encountered by walking the proxy graph depicted in FIG. 6 are Targeter, Rail, and Moon. The system therefore loads the Human, Rail, Targeter, and Moon models. The Phone and Cup models are not loaded as the Human model does not depend on them, but rather the opposite. If the animator had selected the Cup model for animation instead, then Cup, Human, Rail, Target, and Moon models would be loaded.

From the set of models that have been loaded into a computer memory, the user may also specify a particular model to be unloaded from the computer memory. Since other models may depend on the model that is to be unloaded, the other models should also be unloaded to prevent incorrect animation of those models. According to an embodiment of the present invention, the proxy connectivity graph may be used to determine which other models must be unloaded.

Figure 7B:
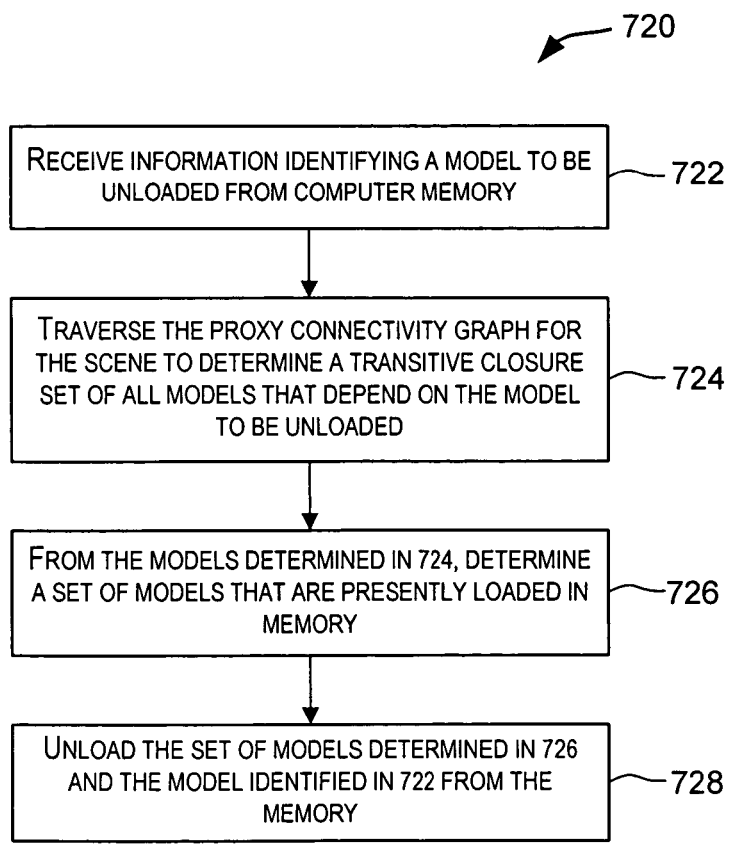
FIG. 7B is a simplified high-level flowchart 720 depicting a method of unloading models from computer memory according to an embodiment of the present invention.

FIG. 7B is a simplified high-level flowchart 720 depicting a method of unloading models from computer memory according to an embodiment of the present invention. The method depicted in FIG. 7B may be performed by software modules executed by a processor, hardware modules, or combinations thereof. Flowchart 720 depicted in FIG. 7B is merely illustrative of an embodiment of the present invention and is not intended to limit the scope of the present invention. Other variations, modifications, and alternatives are also within the scope of the present invention. The method depicted in FIG. 7B may be adapted to work with different implementation constraints.

As depicted in FIG. 7B, information may be received from a user (e.g., an animator) identifying a model to be unloaded from the memory of a computer (step 722). In response to the user request, the proxy connectivity graph is traversed to identify a transitive closure set of all models that depend, either directly or indirectly, on the model to be unloaded (step 724). According to an embodiment of the present invention, as part of step 724, a node from the proxy graph is determined for each output of the model to be unloaded. Each node representing an output of the particular model to be unloaded is examined in turn. Using the output node (i.e., a node representing an output) being examined as the starting point and using the directed links of the proxy graph, the proxy graph is traversed or walked in the opposite direction of the dependencies (i.e., if a directed arrow in the proxy graph from a first node to a second node indicates that the first node depends on or uses the value of the second node, then the graph is walked in the direction from a node pointed to by an arrow to the node connected to the source of the arrow) to identify nodes that depend, either directly or indirectly, on the node representing the output of the model being examined. Accordingly, the directed links between the nodes are used to walk the graph. As a result of the traversal, a transitive closure set of all inputs and outputs that depend on the output of the model to be unloaded is determined. A record is kept of which models' nodes are encountered during the "reverse" walk (i.e., models whose inputs or outputs are included in the transitive closure set). The union of the models recorded for each reverse walk for each output of the model to be unloaded represents the minimal set of models to be unloaded from the computer memory to prevent faulty animation. Any model whose input or output is encountered during the traversals is included in the minimal set of models.

From the models determined in 724, a set of models that are presently loaded in the computer memory are determined (step 726). The models determined in 726 and the user-specified model to be unloaded are then unloaded from the computer memory (step 728). In this manner, embodiments of the present invention prevent "incorrect" animation for a particular model that may result if a model on which the particular model depends is not loaded and available for processing.

Figure 8:
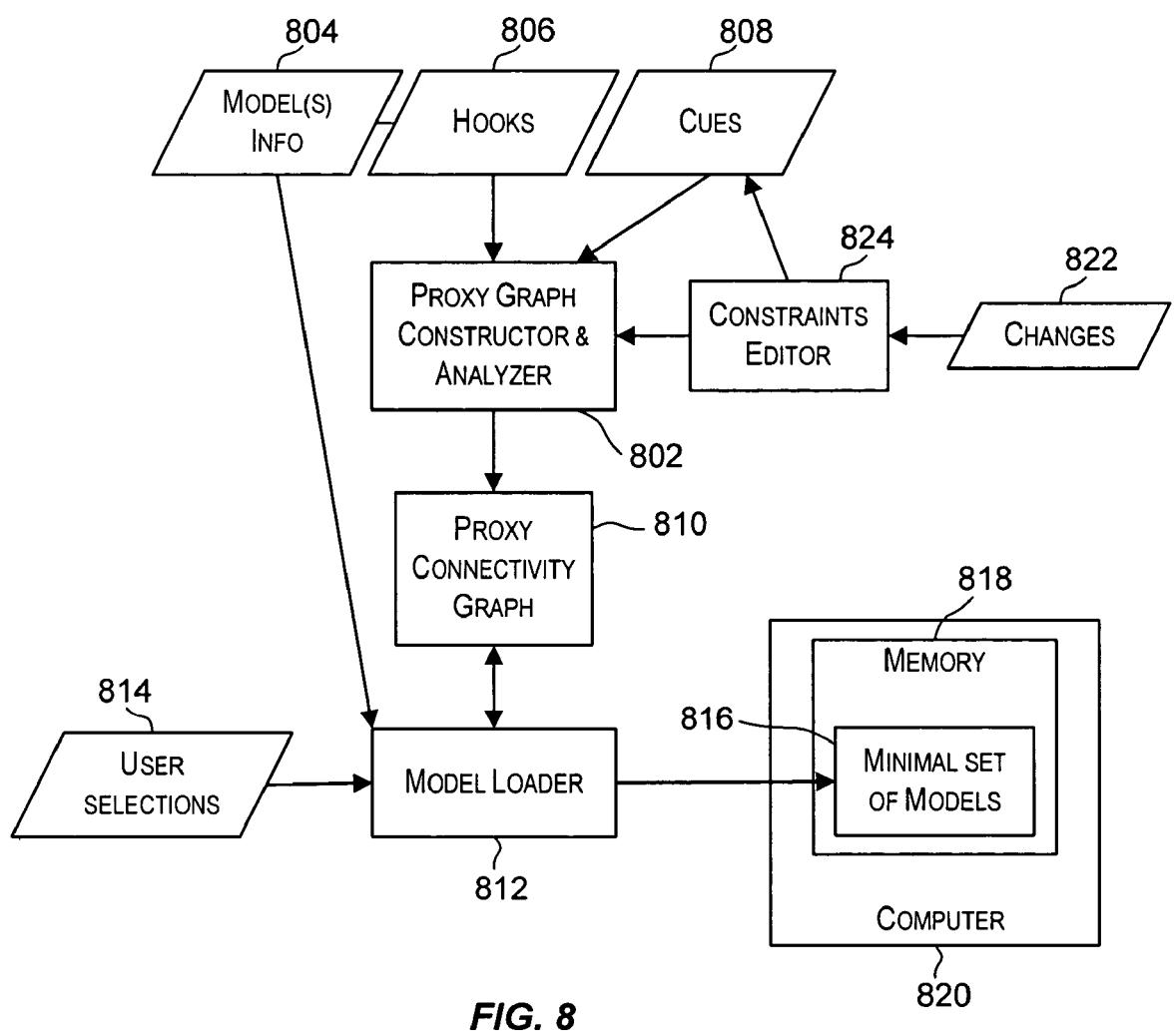
FIG. 8 depicts modules that may be used to construct and manipulate a proxy connectivity graph according to an embodiment of the present invention.

FIG. 8 depicts modules that may be used to construct and manipulate a proxy connectivity graph according to an embodiment of the present invention. The modules depicted in FIG. 8 may be implemented as software, in hardware, or combinations thereof Other variations, modifications, and alternatives are also within the scope of the present invention.

As depicted in FIG. 8, a proxy graph constructor and analyzer (PGCA) module 802 is provided that takes as input hooks 806 associated with models 804 for a scene and cues information 808 for a scene and builds a proxy connectivity graph 810. A model loader 812 may receive information 814 from a user (e.g., an animator) specifying one or more models that are of interest to the user. Model loader 812 is configured to "walk" or traverse proxy connectivity graph 810 to determine a minimal set of models 816 (transitive closure set) that is needed for the user-selected models to evaluate properly. Model loader 812 then loads the models in the minimal set 816 in memory 818 of computer 820 used by the user. Model loader 812 may also be configured to unload models from memory according to the flowchart depicted in FIG. 7B.

The user may also make changes 822 to the scene using constraints editor 824. For example, a user may make or break constraints between models using constraints editor 824, thereby changing the intra and/or inter model dependencies. The changes are stored in cues information 808 for the scene. The changes are also provided to PGCA 802 which is configured to modify proxy connectivity graph 810 to reflect the changes. In this manner, a user can make changes to the scene without having to load all the models for the scene concurrently in computer memory.

The proxy connectivity graph built according to the teachings of the present invention also facilitates rendering of large scenes. Many commercial renderers, including RenderMan® from Pixar™ are generally capable of rendering large scenes if one is able to provide them a fully tessellated (mathematical description of models composed of adjoining 3D polygons) description of the scene in a single and consistent coordinate system. However, due to the large and unwieldy nature of tessellated representations, it is generally impractical to store scenes in a tessellated description as they are being animated. Consequently, tessellation of a scene has to generally be performed before the scene can be rendered.

To make tessellation tractable for a scene of arbitrary size and complexity, techniques are needed for automatically decomposing the scene into units or sets that can be tessellated individually. However, due to dependencies between models in a scene that result from animated interactions in the scene, it may not be possible to cleave the scene graph into such disjoint sets. According to an embodiment of the present invention, the proxy connectivity graph is used to facilitate the rendering process. An optimizing graph linearizer uses the proxy graph to trade off model loads for smaller sets (or clusters) of models that must be simultaneously loaded. Since loading models is expensive (adds significantly to the rendering time), the linearizer performs optimization to minimize the number of times each model must be loaded in order to be tessellated without concurrently loading all of the models upon which it depends.

Figure 9:
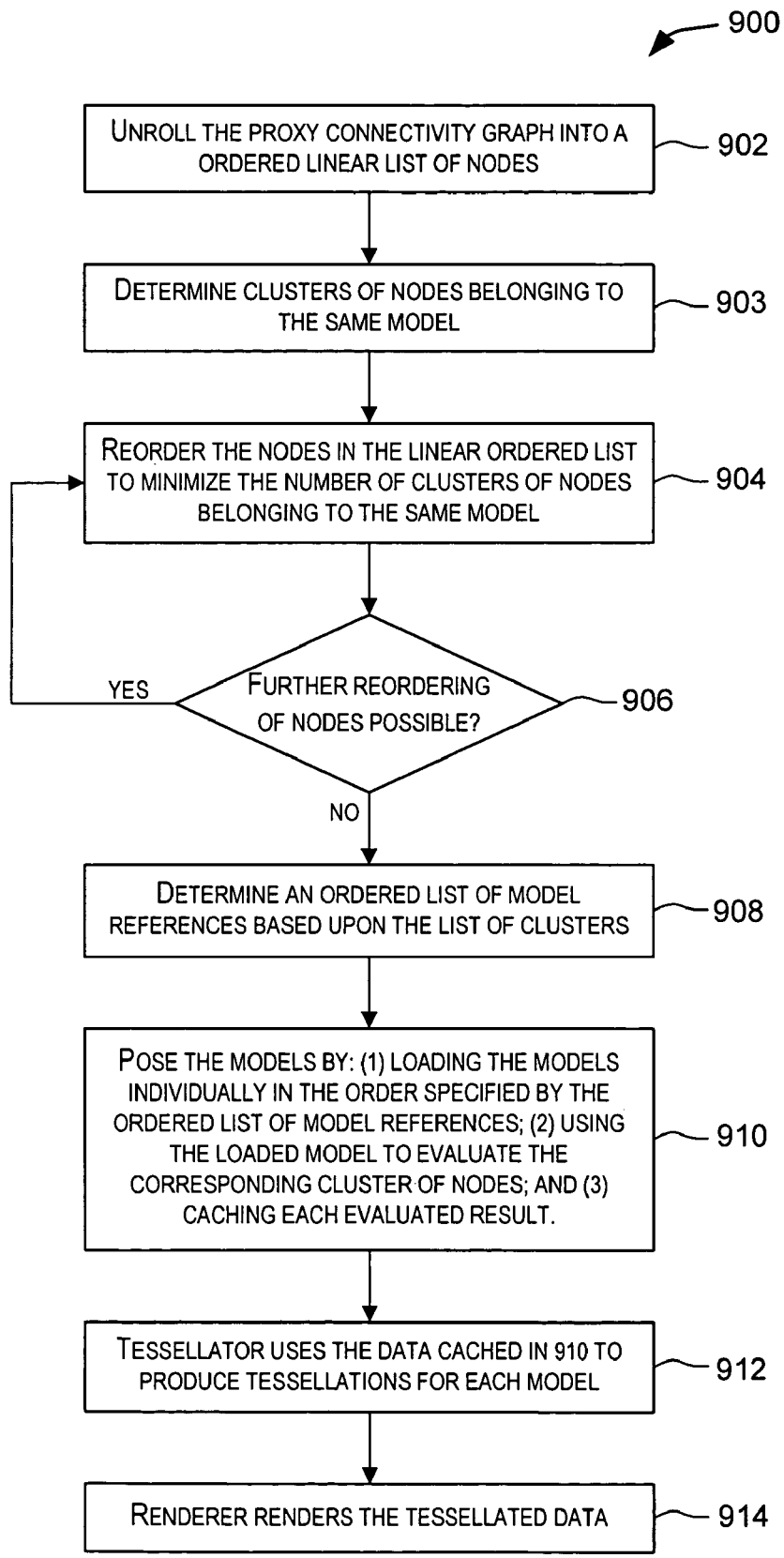
FIG. 9 is a simplified high-level flowchart depicting processing performed to facilitate rendering of a scene according to an embodiment of the present invention.

FIG. 9 is a simplified high-level flowchart 900 depicting processing performed to facilitate rendering of a scene according to an embodiment of the present invention. The method depicted in FIG. 9 may be performed by software modules executed by a processor, hardware modules, or combinations thereof. Flowchart 900 depicted in FIG. 9 is merely illustrative of an embodiment of the present invention and is not intended to limit the scope of the present invention. Other variations, modifications, and alternatives are also within the scope of the present invention. The method depicted in FIG. 9 may be adapted to work with different implementation constraints.

As depicted in FIG. 9, the linearizer "unrolls" the proxy connectivity graph into an ordered linear list of nodes presenting inputs and outputs (step 902). For the description below, a node is a proxy for an input or output of a model; accordingly, an ordered list of inputs and outputs represented by the proxy graph is determined in 902 and used for subsequent processing. The unrolling operation is performed such that the following condition ("the invariant condition") is always satisfied: in the ordered list of nodes (inputs and outputs), all nodes that a particular node depends upon appear in the ordered list before the particular node. For example, if a particular node representing an input (also referred to as an input node) of a model depends on two nodes representing outputs (or output nodes) of another model (implying that the input depends on the two outputs), then in order to satisfy the invariant condition, the two output nodes are positioned before the particular input node in the ordered list of nodes. If the ordered list of nodes is considered to be ordered from left to right, then the invariant condition is satisfied if all nodes that a particular node depends upon appear in the ordered list to the left of the particular node.

The invariant condition guarantees that when the nodes are evaluated (as described below in step 910), all the data that is needed to evaluate a particular node is cached and available before the particular node is evaluated. This ensures proper evaluation of all the nodes in the proxy connectivity graph and the proper rendering of the scene without having to load all the models into computer memory simultaneously.

Clusters (or sets) of nodes belonging to the same model are then determined in the ordered list of nodes (step 903). A cluster comprises one or more nodes of the same model that are contiguous in the ordered list of nodes.

The linearizer then iteratively reorders the nodes in the ordered list to minimize the number of "clusters" (or sets) of nodes that belong to the same model, while ensuring that the invariant condition is satisfied at every stage of the clustering (step 904). Clustering is performed in step 904 to optimize the evaluation process by reducing the number of times that a model must be loaded in order to evaluate the nodes in the ordered list of nodes corresponding to the model. If clustering were not performed, then if "n" nodes of a model were scattered into "m" noncontiguous clusters, the model would need to be loaded "m" times in order to evaluate the nodes of the model. Since loading and unloading a model is expensive in terms of use of computing and memory resources, the goal of the processing performed in step 904 is to cluster nodes of a model into a minimal number of clusters (optimally into one cluster if possible, which implies that the model corresponding to the nodes in the cluster need be loaded only once to evaluate all of the nodes of the model).

The processing in step 904 is repeated until no further reduction in the number of clusters is possible by reordering the nodes without violating the invariant condition. Accordingly, a check is made to determine if any further reordering can be performed (step 906). If no further reordering can be performed, it indicates that an optimal ordering of the nodes has been reached that minimizes the number of times each model must be loaded for the evaluation processing.

An ordered list of model references is then determined based upon the ordering of the clusters in the ordered list of nodes generated at the end of the reordering (step 908).

The models are then evaluated or posed based upon information in the cue (step 910). Posing includes providing a set of values (which may be stored in the cue) to the inputs of a model that position and configure the geometric primitives of the model. The time-varying specification of poses results in animation for a scene. As part of step 910, each model is loaded into a computer's memory according to the order specified by the ordered list of model references determined in step 908. The loaded model is then used to evaluate the nodes (inputs and/or outputs) in the cluster corresponding to the model. The results of each evaluation are cached or stored. Caching the results for each cluster guarantees that information needed for evaluating a particular node (input or output) of a model is available prior to the evaluation of the node. Previously cached results may also be used for evaluating or posing of a model in 910.

The tessellator then produces tessellations for each model based upon the data cached in step 910 (step 912). The tessellator may tessellate each model individually. The caching of information performed in step 910 enables the models to be tessellated in any arbitrary order. According to an embodiment of the present invention, the tessellator sequentially loads each model individually and uses the information cached in 910 for the model and its dependencies to produce tessellations for the loaded model. The tessellated data may then be rendered by a renderer (step 914).

In this manner, a scene of arbitrary complexity can be rendered without needing to load all the models in the scene simultaneously in the memory of a computer. The tessellator can also tessellate the models on a per-model basis without needing to load information for all the models—the cached data is used for the tessellation instead. Accordingly, a computer with a memory that is insufficient to load all the models of the scene may still be used to tessellate and render the scene.

If tessellating an interval of time in the scene (which is the common case), the linearizer in general may be applied for multiple sub-intervals—whenever the dataflow relationships change sufficiently within the interval such that a single unrolling of the proxy graph is no longer sufficient to evaluate the entire interval. By performing a bisection search on the interval and considering all dataflow connections within the interval, we can determine the smallest set of intervals for which the linearizer must be individually applied.

Figure 10:
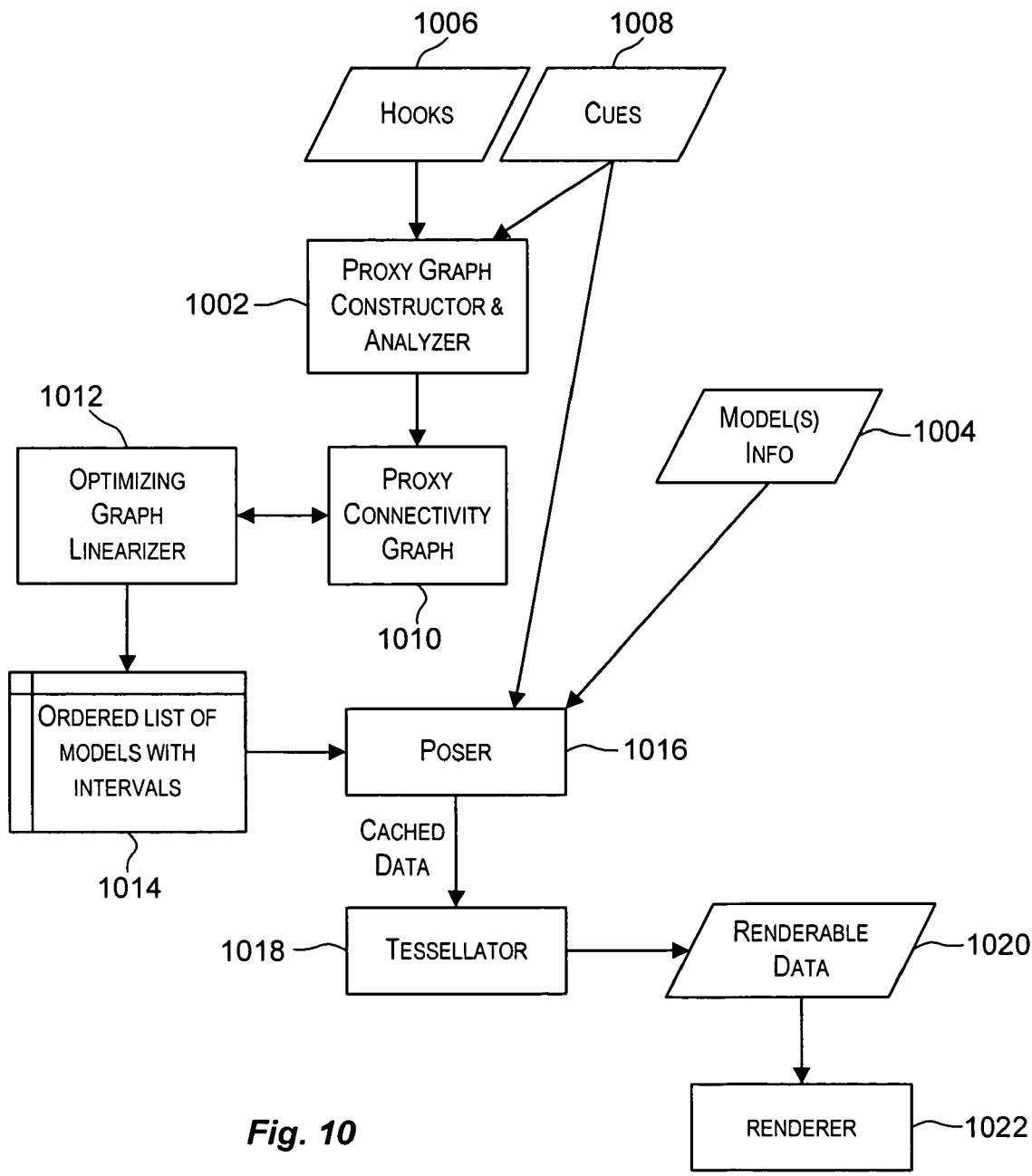
FIG. 10 depicts modules that may be used to perform the processing depicted in FIG. 9 according to an embodiment of the present invention.

FIG. 10 depicts modules that may be used to perform the processing depicted in FIG. 9 according to an embodiment of the present invention. The modules depicted in FIG. 10 may be implemented as software, in hardware, or combinations thereof. Other variations, modifications, and alternatives are also within the scope of the present invention.

As depicted in FIG. 10, a proxy graph constructor and analyzer (PGCA) module 1002 is provided that takes as input hooks 1006 associated with models 1004 for a scene and cues 1008 for the scene and builds a proxy connectivity graph 1010. An optimizing graph linearizer 1012 traverses and unrolls proxy connectivity graph 1010 to generate a linearized ordered list of nodes. Graph linearizer 1012 is configured to iteratively reorder the nodes in the ordered list with the goal of minimizing the number of clusters of nodes belonging to a model while satisfying the invariant condition. After no more re-orderings can be performed, linearizer 1012 may determine a list of ordered model references based upon the ordered list of clusters. The ordered list of model references along with intervals 1014 may then be forwarded to poser 1016.

Poser 1016 is configured to evaluate or pose the models based upon information received from linearizer 1012, cues information 1008, and model information 1004. As part of the posing, each model is loaded into a computer's memory according to the order specified by the ordered list of model references. The loaded model is then used to evaluate the nodes in a cluster corresponding to the model. The results of each evaluation are cached. The models are loaded and unloaded one by one per the ordering in the model list of references until all the models have been evaluated.

The cached data is then used by tessellator 1018 to produce tessellated renderable data 1020. Tessellator 1016 is configured to tessellate each model individually using the cached information. The models can be tessellated in any order. Renderable data 1020 is then communicated to a renderer 1022 (e.g., RenderMan® from Pixar) for rendering.

In this manner, scenes of arbitrary complexity can be rendered with no intervention or decomposition required from the user. Embodiments of the present invention are able to linearize the scene graph in such a way that no more than a few models need ever be resident in the memory of the rendering system simultaneously. The tessellator can tessellate a model without needing to load all the other models concurrently in memory as the information needed for tessellating the model is cached and available to the tessellator.

EXAMPLE

This section uses an example to describe the process of unrolling a proxy graph to produce a linear ordered list of nodes and reordering of nodes in the ordered list to minimize the number of clusters of nodes representing inputs or outputs of the same model (referred to as nodes belonging to the same model) according to an embodiment of the present invention. The example is not intended to limit the scope of the present invention as recited in the claims. The proxy connectivity graph depicted in FIG. 6 is used to illustrate the example.

(1) Obtain a Valid Linear Ordered List (Valid Linearization)

The proxy connectivity graph (depicted in FIG. 6) is unrolled to generate a linear ordered list of nodes. The unrolling is performed such that the invariant condition (that all nodes that a particular node depends upon appear in the ordered list before the particular node) is satisfied. In one embodiment, all proxy nodes of the proxy connectivity graph are iterated through placing the nodes at the end of the (initially empty) linearized list after all nodes upon which they depend have already been added to the list. With proper marking of nodes, this can be performed efficiently in linear time with a simple recursive function.

Figure 11A:
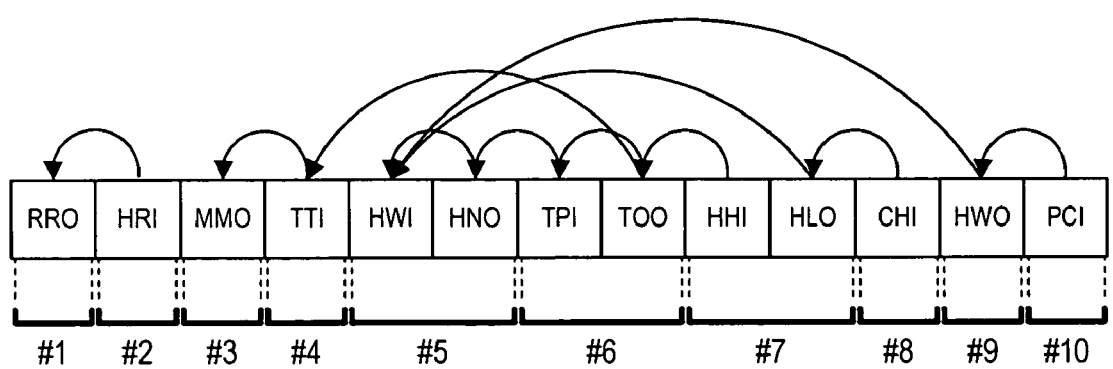
FIGS. 11A through 11F depict various stages of clustering nodes in a linear ordered list according to an embodiment of the present invention.

One typical unrolling of the proxy graph depicted in FIG. 6 is depicted in FIG. 11A, in which arrows indicate dependency. The linear ordered list depicted in FIG. 11A comprises thirteen nodes corresponding to input and output nodes in the proxy connectivity graph depicted in FIG. 6. The nodes are ordered left to right. The arrows indicate the dependencies of the nodes. The nodes in the ordered list depicted in FIG. 11A are clustered into ten clusters comprising nodes of the same model. Each cluster (including the trivial cluster consisting of only one node) will require a model load and unload during the subsequent evaluation stage. Accordingly, if the ordered list depicted in FIG. 11A were used to evaluate the nodes and cache the evaluations for tessellation, the Rail model would need to be loaded and unloaded once (to evaluate nodes in cluster #1), the Human model would need to be loaded and unloaded four times (to evaluate nodes in clusters #2, #5, #7 and #9), the Moon model would need to be loaded and unloaded once (to evaluate nodes in cluster #3), the Targeter model would need to be loaded and unloaded twice (to evaluate nodes in clusters #4 and #6), and Cup would need to be loaded and unloaded once (to evaluate nodes in cluster #8), and the Phone would need to be loaded and unloaded once (to evaluate nodes in cluster #10).

Since it is quite expensive (from a computing time and memory usage perspective) to load and unload a model, embodiments of the present invention attempt to reorder the nodes in the rolled out linear list of ordered nodes to minimize the number of clusters of nodes belonging to the same model, while satisfying the invariant condition. Optimally, each model should be loaded and unloaded only once, i.e., the ordered list should comprise only a single cluster for a model; however, this may not be possible due to the nature of inter-model dependencies present in the scene. Accordingly, the goal of the reordering is to have as few clusters of "same-model-nodes" (i.e. nodes belonging to the same model, indicated by the first letter of node name in our FIG. 11A) in the reordering process as possible. The optimization process is described below.

(2) Cluster Nodes Leftwards

The reordering is initiated by moving each node to the left in order to:

RULE #1: If possible, merge with the leftmost legal cluster of the same model (thus potentially reducing the total number of clusters), otherwise RULE #2: If no such merge is possible, move the node as far left as it can legally move, so that other nodes that may depend on the node itself are freer to merge with other clusters.

In applying these two rules, a move is legal for a particular node as long as the move does not result in the particular node being moved past (to the left of) a node on which the particular node depends (denoted by arrows in the Figs.). Accordingly, a move is illegal if it results in a particular node being moved past (to the left of) a node upon which it depends, as that would violate the invariant condition and thus invalidate the subsequent caching process. The clustering process starts at the beginning of the current linearization, considering each node in turn, and reordering the linearization in place. We will now follow this process through once, showing interesting intermediate orderings of the linear list. As previously stated, the arrows in the Figs. represent the dependencies depicted in the proxy graph depicted in FIG. 6.

Figure 11B:
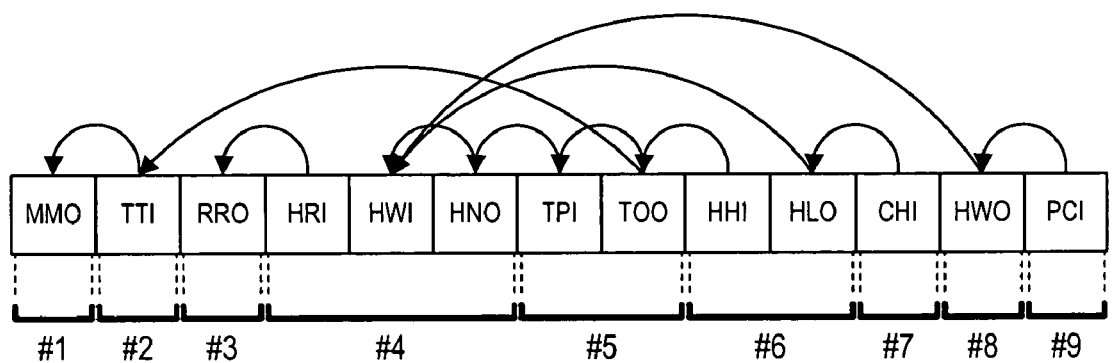

Using the ordered list depicted in FIG. 11A as the starting point, the reordering begins with node RRO in FIG. 11A, which cannot be moved further left since it is already as far left as it can go. Likewise, neither rule can be applied to node HRI, because it depends on RRO. When node MMO is considered, since there are no other "M" clusters (i.e., clusters of nodes belonging to the Moon model) to the left of node MMO, Rule #1 does not apply, but Rule #2 can be applied, moving node MMO past both nodes HRI and RRO. The same analysis applies to node TTI, which moves left until it hits node MMO, upon which it depends. This reordering of the nodes produces the ordered list of nodes depicted in FIG. 11B.

As a result of the reordering, it can be seen that HWI can merge with its left neighbor HRI. The node HNO can also merge with its left neighbor HWI. Accordingly, nodes HRI, HWI, and HNO of the human model are clustered to form a single cluster #4. This reduces the total number of clusters from ten in FIG. 11A to nine in FIG. 11B.

Proceeding to node TPI, neither Rule #1 or Rule #2 can be applied to it. Node TOO can be merged with TPI using Rule #1, without actually moving it. Node HHI cannot be moved or merged because it depends on the node directly to its left (node TOO). Node HLO can be moved to the left by applying Rule #2 until it can merge with a cluster of nodes of the Human model (i.e., cluster #4 depicted in FIG. 11B) to form a larger cluster of nodes. Node CHI can also be moved to the left by applying Rule #2.

Figure 11C:
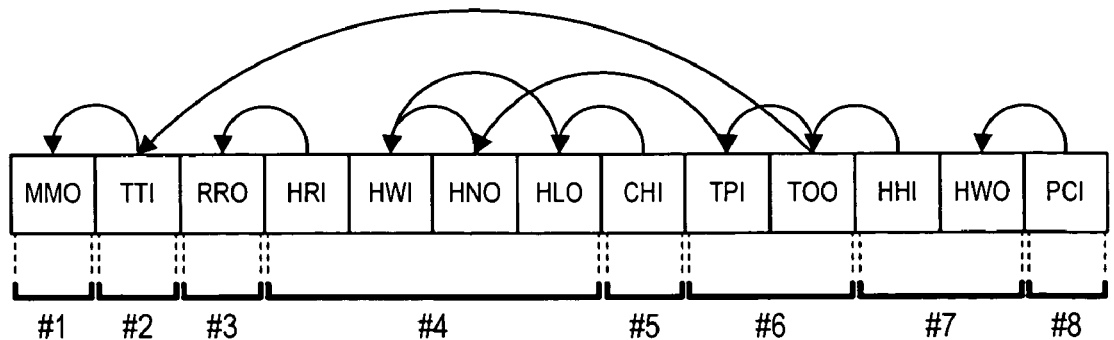

After the reordering described above, the ordered list in FIG. 11B is transformed to the ordered list depicted in FIG. 11C. As can be seen, the number of clusters of nodes of the same model has been reduced from nine in FIG. 11B to eight in FIG. 11C.

Figure 11D:
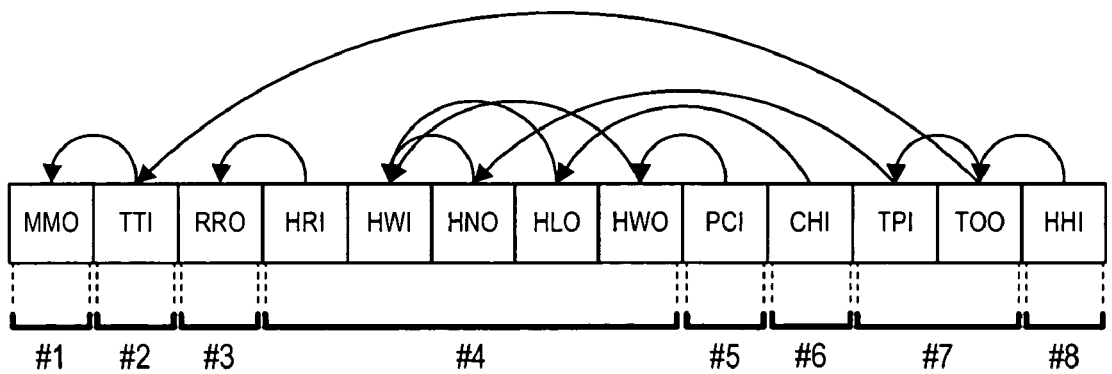

Now, Rule #1 can be applied to node HWO to move it left until is merges with cluster #4 depicted in FIG. 11C. Rule #2 can be applied to node PCI, moving it as left as possible, creating a new linearization as depicted in FIG. 11D. Comparing the linear ordered list depicted in FIG. 11D to the linear ordered list depicted in FIG. 11A, the number of times that the Human model has to be loaded and unloaded has been reduced from four to two, which is the minimum achievable, given the dependencies of the scene. The Targeter model still has to be loaded twice, and repeating the clustering will not improve the ordering further. Next, a "cluster nodes rightwards" technique is applied as described below.

(3) Cluster Nodes Rightwards

An attempt is made to further improve the clustering by merging clusters with other clusters to the right of their current positions in the linearization. To do so, the ordered list in FIG. 11D (resulting from the clustering nodes leftwards) is used as the starting point and clusters are moved to the right, according to the following two rules:

Rule #3: If possible, merge with the rightmost legal cluster of the same model (thus potentially reducing the total number of clusters), otherwise Rule #4: If no such merge is possible, move the node as far right as it can legally move, so that other nodes that may depend on the node itself are freer to merge with other clusters.

Applying this algorithm to the linearization produced by the last step (i.e., the linear ordered list depicted in FIG. 11D), cluster #8 (HHI) and cluster #7 (TOO, TPI) cannot be moved due to their dependencies. Rule #4 can be applied to both clusters #6 (CHI) and #5 (PCI), to give the linear ordered list configuration depicted in FIG. 11E.

Figure 11E:
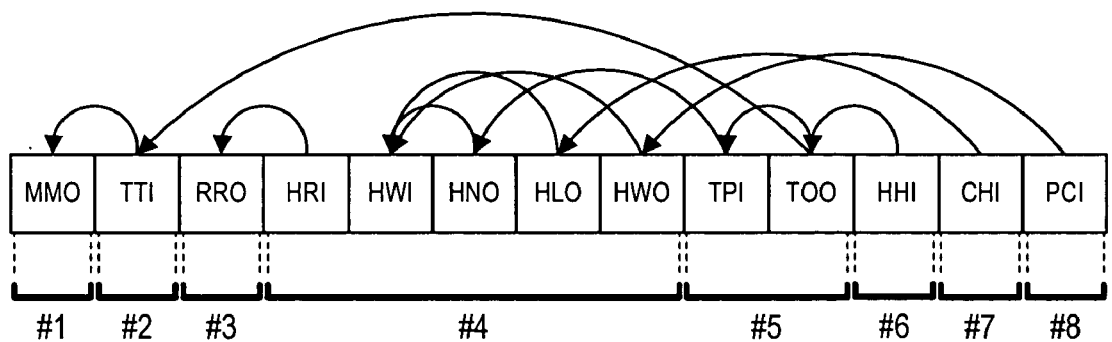
Figure 11F:
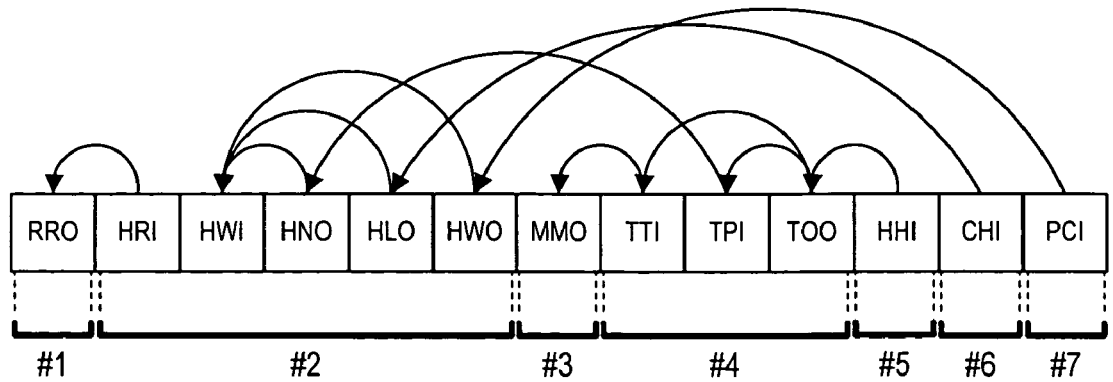

In FIG. 11E, the large cluster #4 of "H" nodes cannot move because TPI, just to its right, depends on one of its nodes, which means that moving past it would violate the invariant condition. However, Rule #3 can be applied to cluster #2 (TTI) depicted in FIG. 11E, merging it with cluster #5 (TPI, TOO). Finally, Rule #4 can be applied to cluster #1 (MMO) depicted in FIG. 11E, and it can be moved as far right as it can go, resulting in a final ordering as depicted in FIG. 11F. The rightwards-clustering has resulted in merging one more cluster.

(4) Repeat Until Merging Ceases

As seen above, the linearization improves when, as a result of applying rules in steps 2 and 3, clusters are merged together. Therefore, since no action will be taken to split clusters, the termination criterion for the optimization is when both steps 2 and step 3 fail to merge any more clusters. It can be verified that a further application of the two steps to the current linearization depicted in FIG. 11F will only be able to apply steps 2 and 4, which do not affect the number of clusters. Thus, it can be verified that the linear ordered list depicted in FIG. 11F represents the optimized list.

The model list of references for the linear list in FIG. 11F is: Rail (to evaluate cluster #1), Human (to evaluate cluster #2), Moon (to evaluate cluster #3), Targeter (to evaluate cluster #4), Human (to evaluate cluster #5), Cup (to evaluate cluster #6), and Phone (to evaluate cluster #7). Accordingly, the Human model must be loaded twice and the other models must be loaded only once during the evaluation of the nodes (inputs and outputs) of the models.

Several iterations of steps 2, 3 and 4 may be needed in other embodiments analyzing more complicated (realistic) scenes in the production environment before merging is completed (i.e., before an optimized ordered list is arrived at). With the appropriate data structures, each iteration can be accomplished in order N*F time, where N is the number of nodes (or proxies) in the proxy connectivity graph and F is the maximum number of direct dependencies any particular node or proxy has. Since F is generally a small constant and does not scale with the complexity of the scene, the algorithms therefore scale roughly linearly with scene complexity, which is the best complexity achievable by any renderer. Accordingly, the optimizer does not itself impact overall rendering performance.

Hierarchical Clustering

In the optimization algorithm described above, the only clustering metric that is used is the model to which a node belongs. Embodiments of the present invention also support the mechanism of hierarchically grouping models (one model becomes a child of another model), both to aid in organization of complex scenes, and to facilitate sharing (through inheritance, in which a child inherits from its parent) of various properties that affect the appearance of geometric primitives.

In order to evaluate any model (for caching or final tessellation) that inherits properties from its ancestors, both the model and all of its ancestors must be simultaneously loaded in a computer's memory. This makes it efficient to attempt to consider all of a model's child models in succession, due to which a loaded model does not need to be unloaded in order to load some other model's parent.

An elegant generalization of the algorithm presented above enables optimization of linearizations to accommodate model hierarchies. The above algorithm considers clustering based only on the predicate of proxy (node) membership in individual models. Let us instead consider allowing a hierarchical sequence of predicates, in which a set of clusters built by an iteration of the above algorithm using predicate "n" is used as the atomic unit for clustering in iteration "n+1", which will use predicate "n+1".

This generalization can be used by iterating the optimization algorithm over "n" input predicates. For each predicate i, Rule #1 from above is modified as (similarly for Rule #3):

Rule #1(mod): If possible, merge with the leftmost legal cluster of the same cluster(i) (thus potentially reducing the total number of clusters), otherwise Rule #2(mod): If no such merge is possible, move the cluster as far left as it can legally move, so that other clusters that may depend on the cluster itself are freer to merge with other clusters.

Wherein cluster(0) is the zero'th predicate, corresponding to the model to which the proxies belong, and cluster(i>0) corresponds to the i'th ancestor of the model.

When an iteration of the optimizing algorithm has been completed for each predicate in sequence, an optimal ordering is produced for the caching process.

Interval Rendering

In an embodiment of the present invention, the linear list optimization algorithm described above may be extended to take advantage of coherence in multi-frame-rendering. In a typical animation consisting of dozens to hundreds of frames (e.g., 24 rendered frames per second of animation), there is much that is the same or only slightly different from one frame to the next. Inter-model dependencies due to dataflow connections are frequently coherent over a significant frame range, and by computing a single optimized linearization that can be used by the tessellator over multiple sequential frames, the number of times that each model must to be loaded can be reduced. In most instances, this speeds up the tessellation of "n" frames simultaneously by nearly a factor of "n".

The algorithm may be configured to enable it to consider proxy graphs that do not represent a single instant in time, but rather all the dependencies active over an interval of time. Proxy graphs may further be characterized as a consistent proxy graph, one that can be linearized into an ordering that obeys the invariant condition (and thus can be used to accurately evaluate and cache the node proxies), and an inconsistent proxy graph, one that cannot be linearized into an ordering that obeys the invariant condition because it contains a cycle. Cycles are easy to detect in the proxy graph (or any graph), and thus enable embodiments of the present invention an efficient means of determining whether a given proxy graph is consistent.

Given these extensions to proxy graphs, the goal is to decompose a given animation and frame range over the animation into the smallest number of intervals possible such that:

1. The sequential intervals pack tightly (i.e. the union of all the intervals completely covers the input frame range)
2. Each interval corresponds to a consistent proxy graph defined over the interval, which means a single optimized linearization of the graph can be obtained to use across all frames in the interval.

Making use only of the first step in the optimizer algorithm (producing a valid linearization) to evaluate whether a given proxy graph is consistent, processing proceeds as follows:

(1) First, calculate, over the frame-range, all the times at which any dataflow relationship changes. The boundaries in time of consistent intervals will always lie on such frames. These frames are then placed into a change sequence.

(2) Beginning with the entire frame range as the (single) interval, perform binary subdivision using the change sequence until each interval is consistent. Each test of an interval requires creating the proxy graph for the interval, and verifying whether the proxy graph is consistent.

Once the intervals have been discovered, the optimizer is executed once for the proxy graph of each interval, and the caching phase can evaluate and cache each model over the entire interval without reloading.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software (e.g., software code modules, instructions), it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of facilitating animation of a scene comprising a plurality of objects, the plurality of objects represented by a plurality of models, the method comprising:
   receiving information identifying a first model to be animated from the plurality of models;
   using a first representation to determine a set of models from the plurality of models that are needed for evaluation of the first model, the first representation comprising information identifying one or more inputs and outputs of the models in the plurality of models and identifying dependencies between the one or more inputs and outputs; and
   loading the first model and the set of models in computer memory, wherein the plurality of models comprises at least one model that is not loaded into the computer memory;
   wherein the first representation is a graph comprising a plurality of nodes and links between the nodes, wherein the nodes represent the inputs and the outputs of the plurality of models and the links represent the dependencies between the inputs and the outputs.

2. The method of claim 1 wherein using the first representation to determine the set of models comprises:
   for each input of the first model:
      determining a first node in the graph representing the input;
      traversing the graph from the firstnode using the links; and
      including a model from the plurality of models in the set of models if at least one node of the model is encountered during the traversing.

3. The method of claim 2 wherein, for each input of the first model, traversing the graph from the first node using the links comprises determining a transitive closure set of all nodes in the graph that represent inputs or outputs of the plurality of models on which the input of the first model depends.

4. The method of claim 1 further comprising receiving information specifying animation for the first model.

5. The method of claim 1 wherein using the first representation to determine the set of models comprises determining a transitive closure set of one or more models from the plurality of models on which the first model depends.

6. A computer-implemented method of facilitating animation of a scene comprising a plurality of objects, the plurality of objects represented by a plurality of models, the method comprising:
   receiving information identifying a first model from the plurality of models to be unloaded from computer memory;
   using a first representation to determine a first set of models from the plurality of models that depend on the first model, the first representation comprising information identifying one or more inputs and outputs of the models in the plurality of models and identifying dependencies between the one or more inputs and outputs; and
   unloading, from the computer memory, the first model and one or more models from the first set of models that are loaded in the computer memory;
   wherein the first representation is a graph comprising a plurality of nodes and links between the nodes, wherein the nodes represent the inputs and the outputs of the plurality of models and the links represent the dependencies between the inputs and the outputs.

7. The method of claim 6 wherein using the first representation to determine the first set of models comprises:
for each output of the first model:
determining a first node in the graph representing the output;
traversing the graph from the first node using the links; and
including a model from the plurality of models in the first set of models if at least one node of the model is encountered during the traversing.

8. The method of claim 7 wherein, for each output of the first model, traversing the graph from the first node using the links comprises determining a transitive closure set of all nodes in the graph that represent inputs or outputs of the plurality of models that depend on the output of the first model.

9. The method of claim 6 wherein using the first representation to determine the first set of models comprises determining a transitive closure set of one or more models from the plurality of models that depend on the first model.

10. A computer program product stored on a computer-readable medium for facilitating animation of a scene comprising a plurality of objects, the plurality objects represented by a plurality of models, the computer program product comprising:
code for receiving information identifying a first model to be animated from the plurality of models;
code for using a first representation to determine a set of models from the plurality of models that are needed for evaluation of the first model, the first representation comprising information identifying one or more inputs and outputs of the models in the plurality of models and identifying dependencies between the one or more inputs and outputs; and
code for loading the first model and the set of models in computer memory, wherein the plurality of models comprises at least one model that is not loaded into the computer memory;
wherein the first representation is a graph comprising a plurality of nodes and links between the nodes, wherein the nodes represent the inputs and the outputs of the plurality of models and the links represent the dependencies between the inputs and the outputs.

11. The computer program product of claim 10 wherein the code for using the first representation to determine the set of models comprises:
for each input of the first model:
code for determining a first node in the graph representing the input;
code for traversing the graph from the first node using the links; and
code for including a model from the plurality of models in the set of models if at least one node of the model is encountered during the traversing.

12. The computer program product of claim 11 wherein, for each input of the first model, the code for traversing the directed graph from the first node using the directed links comprises code for determining a transitive closure set of all nodes in the directed graph that represent inputs or outputs of the plurality of models on which the input of the first model depends.

13. The computer program product of claim 10 further comprising code for receiving information specifying animation for the first model.

14. The computer program product of claim 10 wherein the code for using the first representation to determine the set of models comprises code for determining a transitive closure set of one or more models from the plurality of models on which the first model depends.

15. A computer program product stored on a computer-readable medium for facilitating animation of a scene comprising a plurality of objects, the plurality of objects represented by a plurality of models, the computer program product comprising:
code for receiving information identifying a first model from the plurality of models to be unloaded from computer memory;
code for using a first representation to determine a first set of models from the plurality of models that depend on the first model, the first representation comprising information identifying one or more inputs and outputs of the models in the plurality of models and identifying dependencies between the one or more inputs and outputs; and
code for unloading, from the computer memory, the first model and one or more models from the first set of models that are loaded in the computer memory;
wherein the first representation is a graph comprising a plurality of nodes and links between the nodes, wherein the nodes represent the inputs and the outputs of the plurality of models and the links represent the dependencies between the inputs and the outputs.

16. The computer program product of claim 15 wherein the code for using the first representation to determine the first set of models comprises:
for each output of the first model:
code for determining a first node in the graph representing the output;
code for traversing the graph from the first node using the links; and
code for including a model from the plurality of models in the first set of models if at least one node of the model is encountered during the traversing.

17. The computer program product of claim 16 wherein, for each output of the first model, the code for traversing the graph from the first node using the links comprises code for determining a transitive closure set of all nodes in the graph that represent inputs or outputs of the plurality of models that depend on the output of the first model.

18. The computer program product of claim 15 wherein the code for using the first representation to determine the first set of models comprises code for determining a transitive closure set of one or more models from the plurality of models that depend on the first model.

19. A system for facilitating animation of a scene comprising a plurality of objects, the plurality of objects represented by a plurality of models, the system comprising:
a processor;
a volatile memory coupled to the processor;
a storage subsystem coupled to the processor, the storage subsystem is configured to store instructions that when executed by the processor cause the processor to:
receive information identifying a first model to be animated from the plurality of models;
use a first representation to determine a set of models from the plurality of models that are needed for evaluation of the first model, the first representation comprising information identifying one or more inputs and outputs of the models in the plurality of models and identifying dependencies between the one or more inputs and outputs; and load the first model and the set of models in volatile memory, wherein the plurality of models comprises at least one model that is not loaded into the computer memory;

wherein the first representation is a graph comprising a plurality of nodes and links between the nodes, wherein the nodes represent the inputs and the outputs of the plurality of models and the links represent the dependencies between the inputs and the outputs.

20. The system of claim 19 wherein:

the storage subsystem is configured to store instructions that when executed by the processor cause the processor to determine, from the graph, a transitive closure set of all inputs and outputs of the plurality of models on which the one or more inputs of the first model depend, and include a model from the plurality of models in the set of models if an input or output of the model is included in the transitive closure set.

21. The system of claim 19 wherein the storage subsystem is configured to store instructions that when executed by the processor cause the processor to determine a transitive closure set of one or more models from the plurality of models on which the first model depends.

22. A system for facilitating animation of a scene comprising a plurality of objects, the plurality of objects represented by a plurality of models, the system comprising:

a processor;

a volatile memory coupled to the processor;

a storage subsystem coupled to the processor, the storage subsystem is configured to store instructions that when executed by the processor cause the processor to:

receive information identifying a first model from the plurality of models to be unloaded from computer memory;

use a first representation to determine a first set of models from the plurality of models that depend on the first model, the first representation comprising information identifying one or more inputs and outputs of the models in the plurality of models and identifying dependencies between the one or more inputs and outputs; and unload, from the volatile memory, the first model and one or more models from the first set of models that are loaded in the volatile memory;

wherein the first representation is a graph comprising a plurality of nodes and links between the nodes, wherein the nodes represent the inputs and the outputs of the plurality of models and the links represent the dependencies between the inputs and the outputs.

23. The system of claim 22 wherein:

the storage subsystem is configured to store instructions that when executed by the processor cause the processor to determine, from the graph, a transitive closure set of all inputs and outputs of the plurality of models that depend on the one or more outputs of the first model, and include a model from the plurality of models in the first set of models if an input or output of the model is included in the transitive closure set.

24. The system of claim 22 wherein the storage subsystem is configured to store instructions that when executed by the processor cause the processor to determine a transitive closure set of one or more models from the plurality of models that depend on the first model.

25. An apparatus for facilitating animation of a scene comprising a plurality of objects, the plurality of objects represented by a plurality of models, the apparatus comprising:

means for receiving information identifying a first model to be animated from the plurality of models;

means for using a first representation to determine a set of models from the plurality of models that are needed for evaluation of the first model, the first representation comprising information identifying one or more inputs and outputs of the models in the plurality of models and identifying dependencies between the one or more inputs and outputs; and means for loading the first model and the set of models in computer memory, wherein the plurality of models comprises at least one model that is not loaded into the computer memory;

wherein the first representation is a graph comprising a plurality of nodes and links between the nodes, wherein the nodes represent the inputs and the outputs of the plurality of models and the links represent the dependencies between the inputs and the outputs.

26. An apparatus for facilitating animation of a scene comprising a plurality of objects, the plurality of objects represented by a plurality of models, the apparatus comprising:

means for receiving information identifying a first model from the plurality of models to be unloaded from computer memory;

means for using a first representation to determine a first set of models from the plurality of models that depend on the first model, the first representation comprising information identifying one or more inputs and outputs of the models in the plurality of models and identifying dependencies between the one or more inputs and outputs; and means for unloading, from the computer memory, the first model and one or more models from the first set of models that are loaded in the computer memory;

wherein the first representation is a graph comprising a plurality of nodes and links between the nodes, wherein the nodes represent the inputs and the outputs of the plurality of models and the links represent the dependencies between the inputs and the outputs.

* * * * *

UNITED STATES PATENT AND TRADEMARK OFFICE
CERTIFICATE OF CORRECTION

PATENT NO. : 7,064,761 B2  Page 1 of 1
APPLICATION NO. : 10/843224
DATED : June 20, 2006
INVENTOR(S) : Frank Sebastian Grassia et al.

It is certified that error appears in the above-identified patent and that said Letters Patent is hereby corrected as shown below:

In Claim 2, Column 22. Line 29, please delete "firstnode" and insert -- first node --.

In Claim 10, Column 23, Line, 23, please delete "the plurality objects" and insert -- the plurality of objects --.

Signed and Sealed this

Nineteenth Day of September, 2006

JON W. DUDAS
*Director of the United States Patent and Trademark Office*